United States Patent [19]

Matsui et al.

[11] Patent Number: 4,946,197
[45] Date of Patent: Aug. 7, 1990

[54] AUTOMATIC SEAT BELT SYSTEM

[75] Inventors: Kenji Matsui; Tatsuo Yamashita, both of Niwa, Japan

[73] Assignee: Kabushiki Kaisha Tokai-Rika-Denki-Seisakusho, Japan

[21] Appl. No.: 329,409

[22] Filed: Mar. 27, 1989

[30] Foreign Application Priority Data

| Mar. 31, 1988 | [JP] | Japan | 63-44163[U] |
| Mar. 31, 1988 | [JP] | Japan | 63-44161[U] |
| Mar. 31, 1988 | [JP] | Japan | 63-44162[U] |
| Mar. 31, 1988 | [JP] | Japan | 63-44164[U] |

[51] Int. Cl.$^5$ .......................................... B60R 22/06
[52] U.S. Cl. ................................................. 280/804
[58] Field of Search ........................ 280/801, 802, 804

[56]  References Cited

U.S. PATENT DOCUMENTS

| 4,444,417 | 4/1984 | Ueda ........................................ 280/804 |
| 4,573,709 | 3/1986 | Kawai et al. ............................. 280/804 |
| 4,653,774 | 3/1987 | Morner ..................................... 280/804 |
| 4,738,470 | 4/1988 | Matsui et al. ............................ 280/804 |
| 4,776,611 | 10/1988 | Tamura et al. .......................... 280/804 |
| 4,846,497 | 7/1989 | Matsui et al. ............................ 280/804 |

Primary Examiner—Richard A. Bertsch
Attorney, Agent, or Firm—Oliff & Berridge

[57] ABSTRACT

An automatic seat belt system capable of girding a crew member automatically with a webbing, equipped with a reinforcement anchor mounted to reinforce a car rear side end portion of a guide rail supporting shiftably a slider with the webbing locked thereon frontward and rearward of a car. A housing enclosing a lock member engaged with the slider and mounted on the reinforcement anchor, wherein an enclosing part in which the guide rail is inserted longitudinally only is formed on the reinforcement anchor. A locking part locked on the guide rail to constrain a shift of the guide rail is formed on the housing. Accordingly, the guide rail is fixed to the reinforcement anchor through the housing.

20 Claims, 11 Drawing Sheets

AUTOMATIC SEAT BELT SYSTEM

BACKGROUND OF THE INVENTION

1. Field of the Invention

The present invention relates to an automatic seat belt system capable of girding a crew member automatically with a webbing.

2. Description of the Prior Art

Generally, an automatic seat belt system of this kind is structured such that a car room side portion is fitted with a guide rail along a door opening. A slider is supported slidably on the guide rail and an outer side end portion of a crew member constraining webbing is coupled to the slider. The slider is driven by a driving means through a long member, thereby shifting the webbing to a position where the crew member is girded.

In the automatic seat belt system of this structure, a reinforcement anchor is built in a guide rail end portion, on which the slider is supported at the webbing girding position, and the guide rail thus reinforced by the reinforcement anchor is capable of supporting the slider securely in a webbing girded state. Then, a lock member locked to the slider at the position where the crew member is girded with the webbing is supported on the reinforcement anchor. The lock member is locked to the slider in the webbing girded state, thereby constraining a shift of the slider. The lock member is enclosed in a housing and then supported on the reinforcement anchor by incorporating the housing with the reinforcement anchor.

However, in the prior art of an automatic seat belt system of this kind, a reinforcement anchor 10 and a housing 16 are mounted separately on a guide rail 14 and the reinforcement anchor 10 respectively with a fixing means 12 such as a rivet or the like, as shown in FIG. 10 and FIG. 11, thus complicating a construction around the reinforcement anchor 10.

SUMMARY OF THE INVENTION

In consideration of the aforementioned problem, it is an object of the present invention to provide a simple automatic seat belt system construction around a reinforcement anchor.

In the automatic seat belt system relating to this invention, an enclosing part in which a guide rail is inserted in a longitudinal direction only is formed on a reinforcement anchor, a locking part locked to the guide rail and constraining a shift of the reinforcement anchor longitudinally of the guide rail is formed on a housing, and the reinforcement anchor is fixed on the guide rail through the housing.

In the above construction, from inserting the guide rail longitudinally in the enclosing part of the reinforcement anchor and then mounting the housing on the reinforcement anchor, the locking part of the housing is locked to the guide rail to constrain a shift of the reinforcement anchor longitudinally of the guide rail, and the reinforcement anchor is fixed on the guide rail.

BRIEF DESCRIPTION OF THE DRAWINGS

FIG. 1 is a main part sectional view showing a construction around a rear end portion of a guide rail shown in FIG. 9.

FIG. 2 is a main part exploded perspective view of FIG. 1.

FIG. 3 is a sectional view taken on line III—III of FIG. 1.

FIG. 4 is a sectional view taken on line IV—IV of FIG. 1.

FIG. 5 is a main part sectional view showing operation around a lock shaft correspondingly to FIG. 1.

FIG. 6, FIG. 7 and FIG. 8 are each main part sectional views showing a state of a slider shifting in the guide rail of FIG. 9 each.

FIG. 9 is a side view showing a general construction viewed from a car side.

FIG. 10 is a sectional view taken on line X—X of FIG. 11.

FIG. 11 is a side view taken from a car room side.

DETAILED DESCRIPTION OF PREFERRED EMBODIMENT

An automatic seat belt system presented in one embodiment of the invention is represented in FIG. 1 to FIG. 9.

Figure 9:
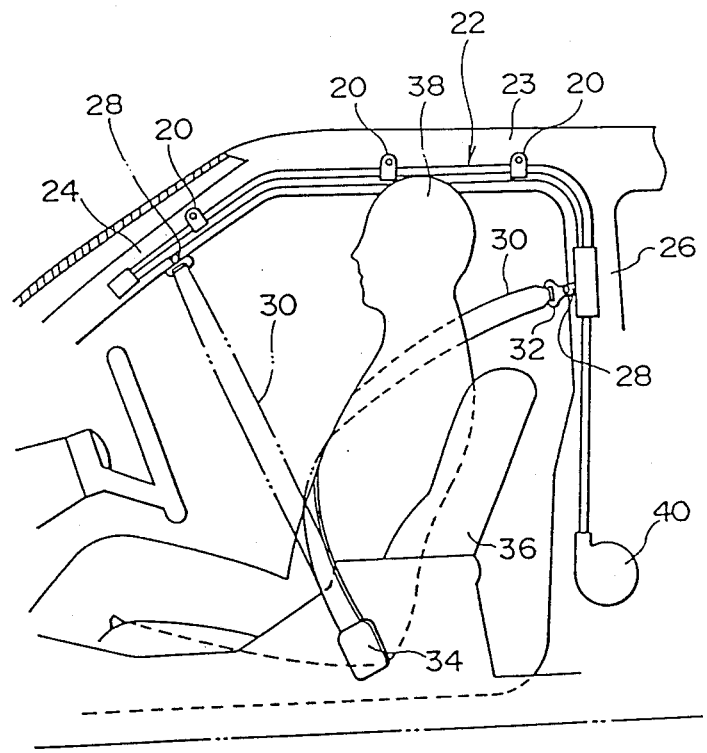
Figure 10:
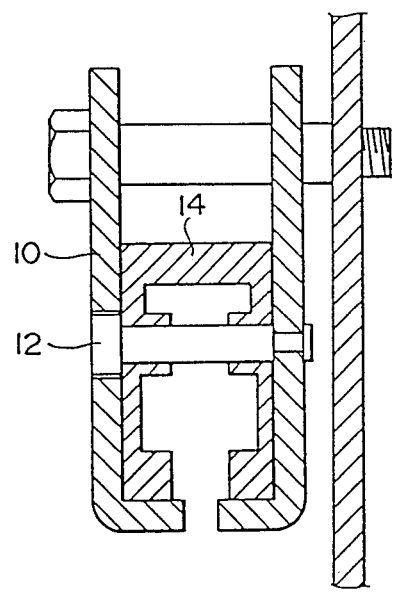
FIG. 10 and FIG. 11 represent a construction around a reinforcement anchor of a conventional automatic seat belt system.
Figure 11:
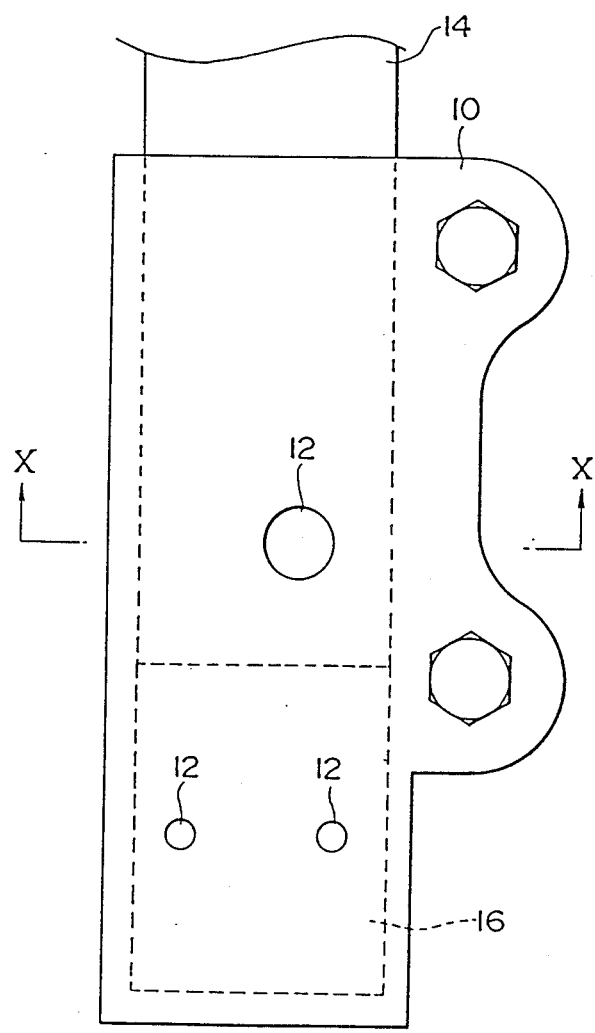

As shown in FIG. 9, a guide rail 22 is mounted on a car room side portion through retainers 20. The guide rail 22 has an intermediate portion disposed on a roof side 23 positioned on an upper part of the car room side portion. A car room front side end portion is bent in an obtuse angle from the intermediate portion and disposed along a front pillar 24. A car room rear side end portion is bent almost rectangularly from the intermediate portion and disposed along a center pillar 26. A slider 28 is supported slidably in a longitudinal direction on the guide rail 22. An outer side end portion of a crew member constraining webbing 30 is locked to the slider 28 through an anchor fitting 32.

An inner side end portion of the webbing 30 is wound in layer by an energizing force and enclosed in a take-up device 34 mounted on a car body at a central portion in the cross direction of a car room, and is normally ready for drawing out of the take-up device 34 against the energizing force. An inner shear lock mechanism for instantaneously stopping the webbing 30 from coming out upon sensing a quick deceleration of the car by an acceleration speed sensor is incorporated in the take-up device 34.

A crew member 38 having taken a seat 36 is girded by the webbing 30 in a state indicated by a solid line. In this state, the slider 28 is positioned at a car room rear side end portion of the guide rail 22, and is released from being girded with the webbing 30 in the state indicated by a two-dot chain line where the slider 28 is positioned at a car room front side end portion of the guide rail 22. The slider 28 is moved by a driving device 40.

Figure 1:
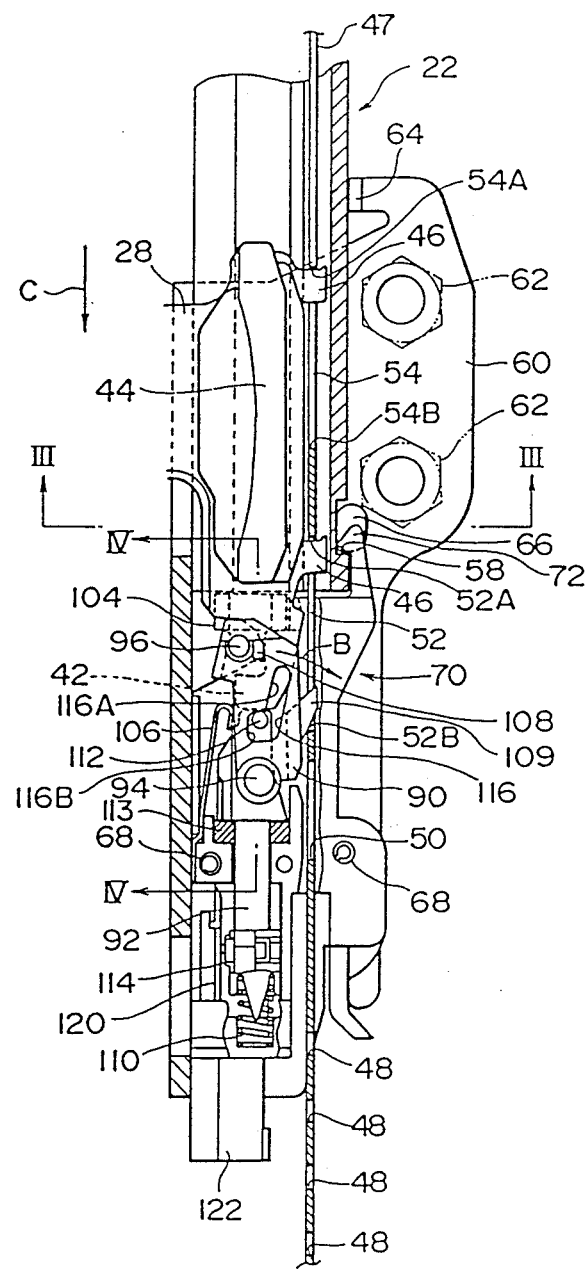
FIG. 1 to FIG. 9 represent an automatic seat belt system given in one embodiment of the invention.
Figure 2:
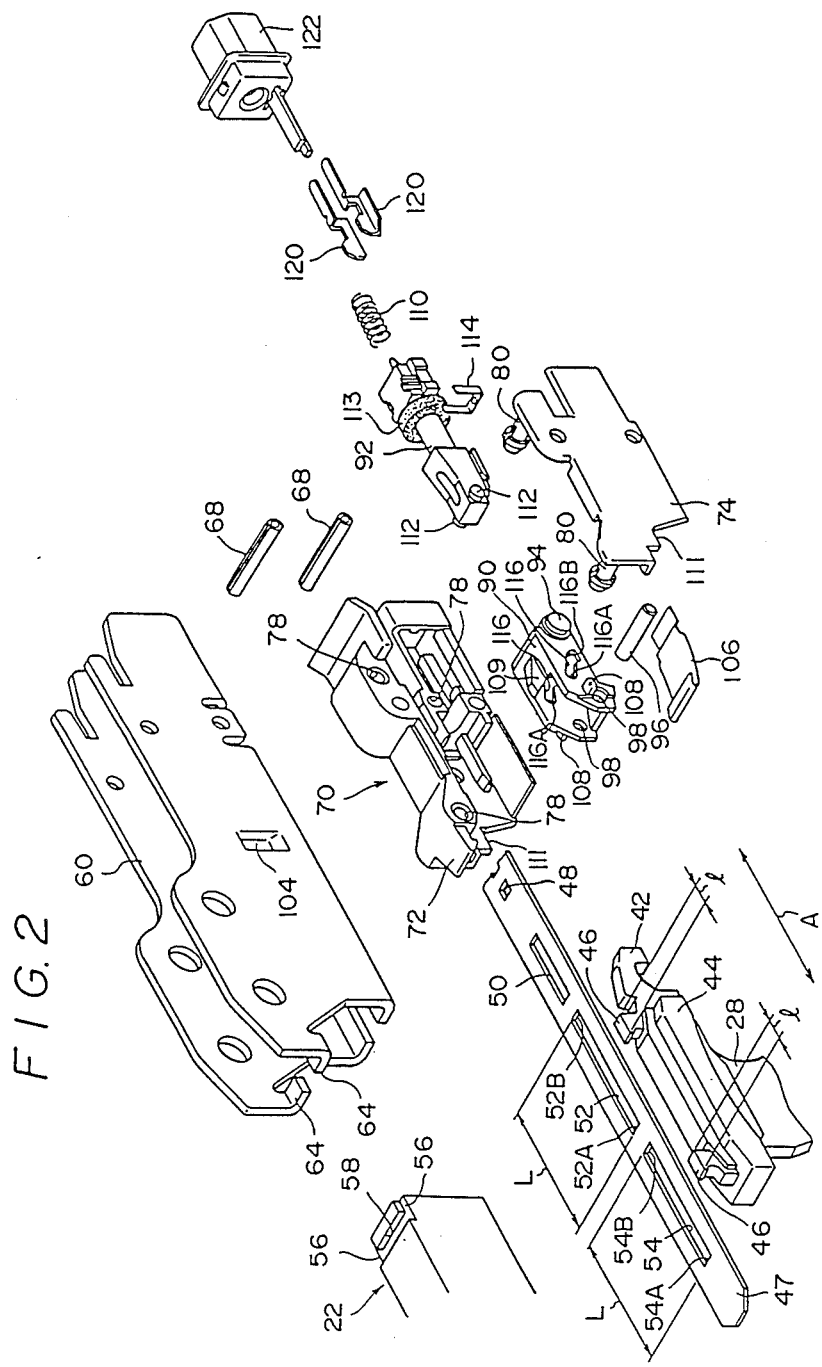
Figure 3:
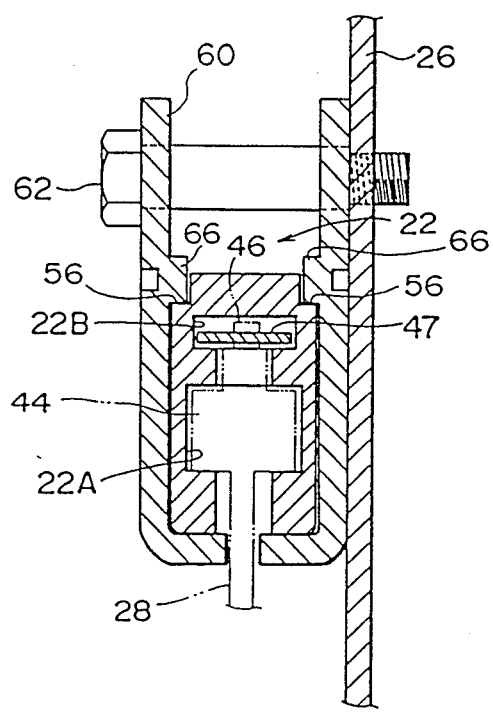

As shown in FIG. 1 and FIG. 2, the slider 28 comprises a thick steel plate with a hook 42 and a claw 46 formed thereon and covered with a head 44 consisting of a relatively soft resin that has a small surface friction factor. As shown in FIG. 3, the head 44 is loose-fitted and slidable in a central portion rectangular sectional part 22A of the guide rail 22. The guide rail 22 comes outward from a section opening of the guide rail 22, and the anchor fitting 32 is journaled into a portion of the guide rail 22 that projects externally. The hook 42 is formed at an end portion on a shifting side of the slider 28 when girded with the webbing, and disposed within the guide rail 22 together with the head 44. The claw 46 is formed in two pieces apart over the head 44 in the direction where the slider shifts (as indicated by an arrow A of FIG. 2), and these are coupled to a driving tape 47 which is a long member within the guide rail 22.

Figure 5:
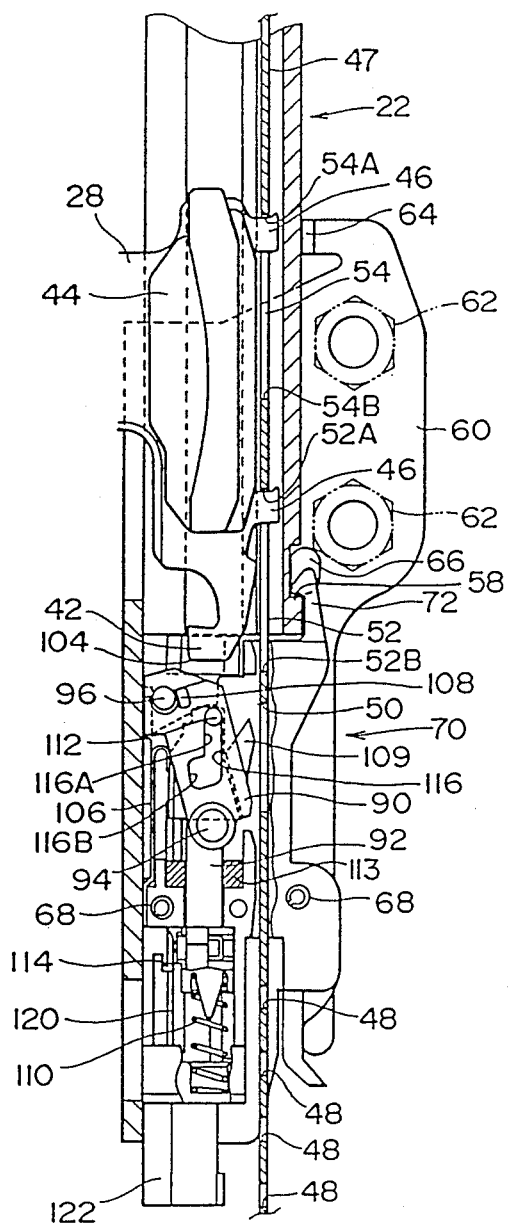

As shown in FIG. 3, the driving tape 47 is enclosed slidably in a bottom rectangular sectional part of the guide rail 22, and is ready for shifting longitudinally along the guide rail 22. As shown in FIG. 1 and FIG. 5, a multiplicity of small diameter openings 48 are formed longitudinally on the tape from a rear end portion toward a front end portion, and elongated slits 50, 52, 54, longer than the longitudinal openings 48 of the tape, are formed adjacently on the front end portion and longitudinally on the tape.

A sprocket wheel (not indicated) provided on the driving device 40 (indicated in FIG. 9) engages with the opening 48, and the driving tape 47 shifts frontward or rearward in the car room by a compressive force or tensile force.

The two elongated slits 52, 54 coming toward the tape end portion are formed longer than the other longitudinally elongated slit 50 on the tape and each function as a locking hole. The two claws 46 of the slider 28 are inserted in the elongated slits 52, 54 in order to couple the driving tape 47 to the slider 28 at two spots, thus moving the slider 28 in accordance with the movement of the driving tape 47. The slider 28 can thus be moved by the driving device 40.

The elongated slits 52, 54 are formed to have a longitudinal size L (indicated in FIG. 2) that is longer than a moving size l (indicated in FIG. 2) of the claws 46 of the slider 28. Thus, a clearance will be formed against the claws 46 of the slider 28 at positions where the claws 46 of the slider 28 come in contact with longitudinal edge portions 52A, 54A of the elongated slits 52, 54 on the car front side or the longitudinal edge portions 52B, 54B on the car rear side. Accordingly, the driving tape 47 and the slider 28 are capable of shifting relatively by the clearance, thus forming a play so as not to allow the slider 28 to shift immediately when the driving tape 47 begins to shift.

Figure 7:
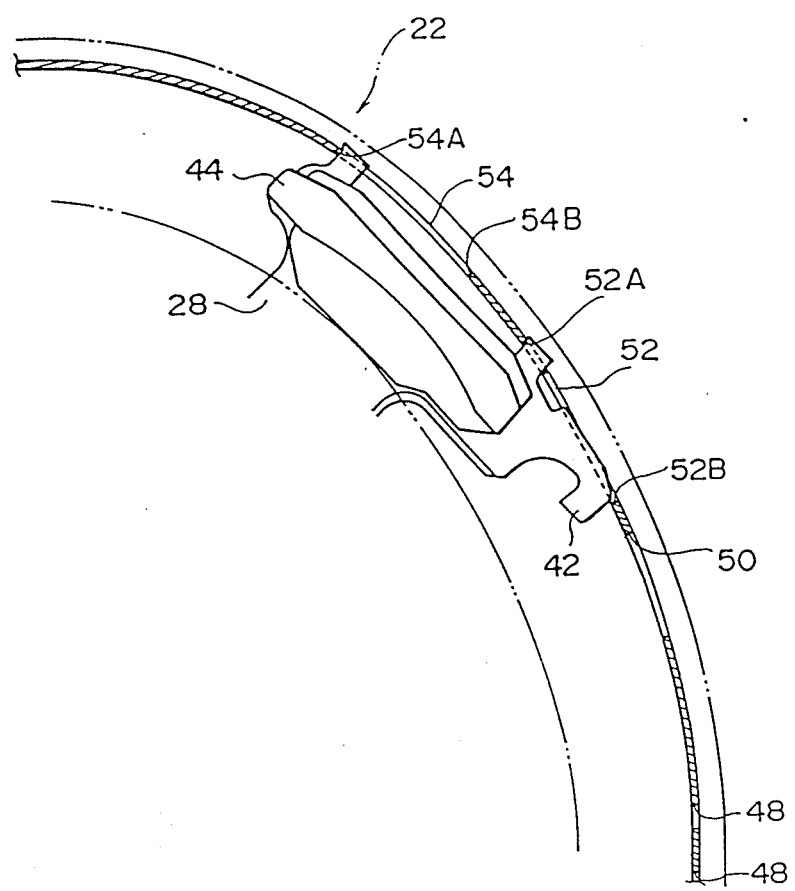

The hook 42 of the slider 28 is inserted in the elongated slit 52 adjacent to the elongated slit 50, as is shown in FIG. 7, when the driving tape 47 is shifted towards the rear of a car room by a tensile force from the driving device 40 and thus the slider 28 reaches a bend of the guide rail 22 (or, for example, guide rail intermediate portion between a portion along the roof side rail 23 and a portion along the center pillar 26), thereby preventing the hook 42 of the slider 28 from interfering with the driving tape 47 at the bend of the guide rail 22.

Figure 8:
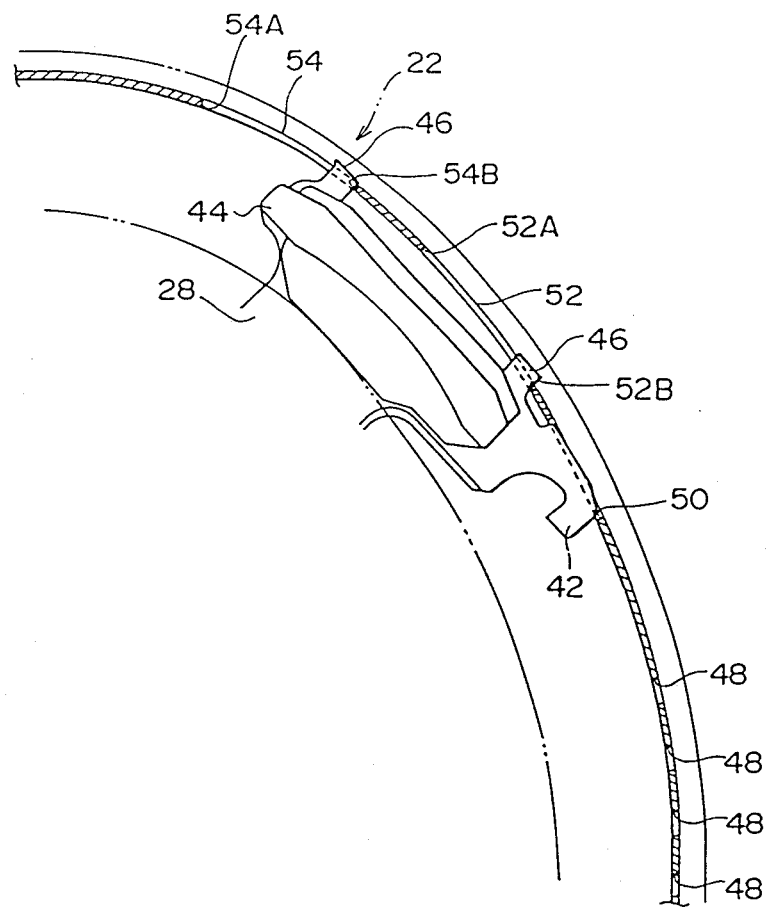

The hook 42 of the slider 28 is inserted in the elongated slip 50, as shown in FIG. 8, when the driving tape 47 is shifted toward the front of the car room by a tensile force from the driving device 40 and thus the slider 28 reaches the bend of the guide rail 22 (or, for example, a guide rail intermediate portion between a portion along the roof side 23 and a portion along the center pillar 26), thereby preventing the hook 42 of the slider 28 from interfering with the driving tape 47 at the bend of the guide rail 22 as in the case of elongated slit 52.

Figure 6:
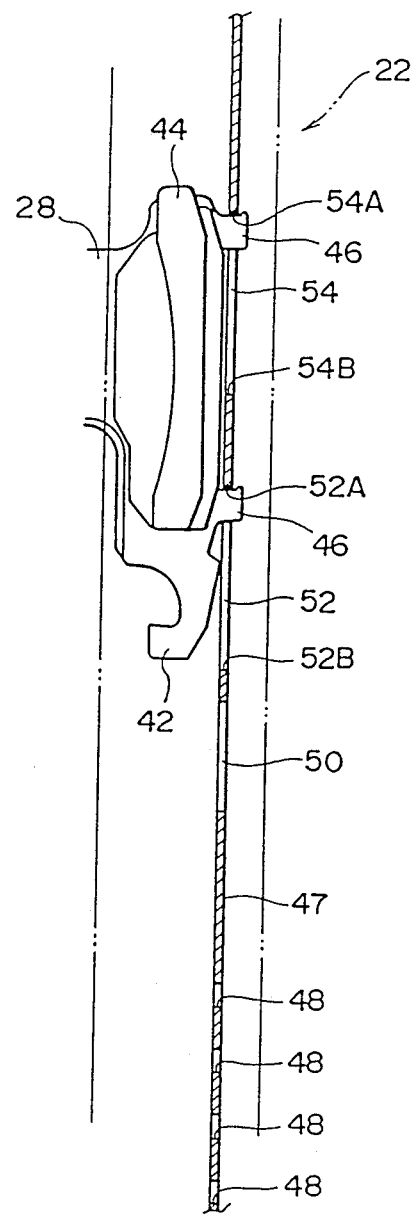

Then, the hook 42 of the slider 28 is separated from the driving tape 47 at a linear portion of the guide rail 22, as shown in FIG. 6, according to its disposition.

Stepped portions 56 (also indicated in FIG. 3) running counter to a protrusion side of the slider 28 longitudinally on opposite sides in the cross direction are formed on the car room rear side end portion of the guide rail 22 as shown in FIG. 2. A groove 58 is formed to connect the stepped portions 56 in the cross direction, and a reinforcement anchor 60 is mounted thereabout as shown in FIG. 1.

The reinforcement anchor 60 is formed into a substantially U-shape by having a thick steel plate bent as shown in FIG. 2 and FIG. 3, and fixed to the center pillar 26 by a bolt 62 thereby enclosing an end portion of the guide rail 22 inside. The reinforcement anchor 60 has protrusions 64 bent inward formed to receive an end portion of the guide rail 22 as shown in FIG. 1 and FIG. 2, and also has projections 66 shown in FIG. 3 formed on an intermediate portion in a longitudinal direction of the guide rail 22, thus forming an enclosing part in which a rear end portion of the guide rail 22 can be inserted in a longitudinal direction only. The protrusions 64 are brought into contact with the surface (right side in FIG. 1) coming near to a front end portion of the guide rail 22 and counter to the side of the guide rail 22 on which the slider protrudes. The projections 66 are kept in contact with the stepped portions 56 of the guide rail 22 as shown in FIG. 3.

The reinforcement anchor 60 is protruded (downward in FIG. 1) from an end portion of the guide rail 22 on a car room rear side, and a housing 70 is mounted inside of the protrusion through a spring pin 68. A hook 72 functioning as a locking part is formed on an end portion of the housing 70 on a guide rail side. The hook 72 is inserted and locked in the groove 58 of the guide rail 22, and the reinforcement anchor 60 is fixed integrally on the guide rail 22 by the protrusions 64 and the projections 66. That is, the reinforcement anchor 60 is kept from falling against the end portion of the guide rail 22 on the car room rear side by the protrusions 64 and the projections 66. It is also kept from coming downward out of the end portion of the guide rail 22 on the car room rear side by the hook 72 of the housing 70, and thus is unified with the guide rail 22. Then, the hook 72 and the groove 58 of the guide rail 22 constitute a locking means. The reinforcement anchor 60 is fixed on the end portion of the guide rail 22 on the car room rear side to function as a reinforcement. Thus the slider 28 can securely be supported at a webbing-girded position.

The reinforcement anchor 60 is ready for mounting integrally on the end portion of the guide rail 22 on the car room rear side. That is, by longitudinally inserting the nose end portion of the guide rail 22 into the reinforcement anchor 60 before setting the housing 70 into the reinforcement anchor 60, the protrusions 64 are put into contact with the surface counter to the side on which the slider protrudes. The projections 66 are then put into contact with the stepped portions 56. By setting the housing 70 into the reinforcement anchor 60 thereafter by means of the spring pin 68, the hook 72 of the housing 70 is locked concurrently in the groove 58 of the guide rail 22, and thus the reinforcement anchor 60 will be mounted integrally on the end portion of the guide rail 22 on the car room rear side.

As shown in FIG. 2, the housing 70 comprises a first housing 72 and a second housing 74. The first housing 72 and the second housing 74 consists of a relatively hard resin. Three projections 80 (one being not indicated) formed on the second housing 74 are fitted and locked into three holes 78 formed on the first housing 72 each forming a hollow zone inside. The driving tape 47 is inserted therein as shown in FIG. 1, and the hook 42 of the slider 28 is made to come thereinto at a webbing-girded position.

As shown in FIG. 1, a ratchet 90 and a slide block 92 are mounted as support members in the housing.

Figure 4:
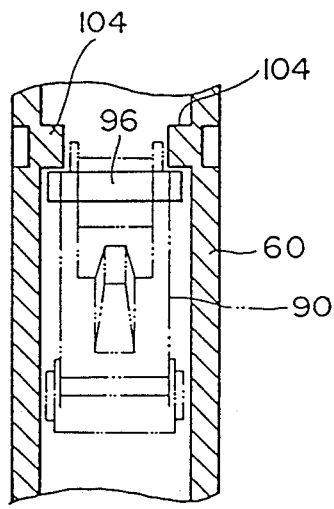

The ratchet 90 is made of resin. With a support shaft 94 formed integrally and mounted swingably in the housing 70 through the support shaft 94. A metallic lock shaft 96 working as a lock member is mounted on the ratchet 90. The lock shaft 96 is fitted in a fitting hole (FIG. 2) formed on the ratchet 90 so as to be unified with the ratchet 90, and is locked onto the hook 42 of the slider 28 at the webbing-girded position as shown in FIG. 1 by a swing of the ratchet 90. The lock shaft 96 has its opposite end portions protrude through the outside of the housing 70 and coordinated with protrusions 104 formed on the reinforcement anchor 60 outside of the housing 70 as shown in FIG. 4. The protrusions 104 are protruded toward the inside of the reinforcement anchor 60 through drawing as shown in FIG. 4, and come in contact with the lock shaft 96 at a position where the lock shaft 96 is locked on the hook 42 of the slider 28, thus locking the slider 28 by the lock shaft 96.

The ratchet 90 is energized by a leaf spring 106 in the direction (as indicated by an arrow B in FIG. 1) where the lock shaft 96 is locked on the hook 42 of the slider 28, and is made to swing by a force of the leaf spring 106 in the direction where the lock shaft 96 is locked on the hook 42 of the slider 28.

The ratchet 90 has protrusions 108 formed adjacently to the lock shaft 96 and also a claw 109 formed correspondingly to the driving tape 47. The protrusions 108 are brought into contact with an end portion 111, or thereabout (FIG. 2), of the housing on a guide rail side at the position where the lock shaft 96 is locked on the hook 42 of the slider 28, thus keeping the lock shaft 96 from coming in contact with the slider 28 when the lock shaft 96 is locked on the hook 42 of the slider 28. The claw 109 is inserted into the elongated slit 52 of the driving tape 47 at a position where the lock shaft 96 is locked on the hook 42 of the slider 28 where is a webbing-using position for the slider 28, and is pushed onto the longitudinal edge portion 52B of the elongated slit 52 on a car rear side when the driving tape 47 shifts toward the front of a car room by a compressive force at the time of release of a webbing-girded state. The ratchet 90 is turned around the support shaft 94 by a pushing force in this case, and detaches the lock shaft 96 from the hook 42 of the slider 28 before the longitudinal edge portion 52B of the elongated slit 52 on the car rear side comes in contact with the claw 46 of the slider 28 so as to shift the slider 28.

The slider block 92 is moveably mounted on the housing 70 in the direction (as indicated by an arrow C in FIG. 1) where the hook 42 of the slider 28 comes in. The slide block 92 is energized in the direction counter to that in which the hook 42 of the slider 28 enters (as indicated by the arrow C in FIG. 1) by a compression coil spring 110, pushed by the hook 42 of the slider 28 when the hook 42 of the slider 28 comes in, and is shifted against a force of the compression coil spring 110 in the direction where the hook 42 of the slider 28 enters. Then a rubber damper 113 is mounted at the intermediate portion of the slide block 92, so that the rubber damper 113 will absorb a jar or shock which occurs when the nook 42 or the slider 28 comes in and contacts with the slide block 92 in the housing 70.

A pin 112 is formed on the slide block 92 integrally therewith, which interlocks with the ratchet 90 through the pin 112 and has a contact 114 constituting switch means fixed thereon.

The pin 112 is inserted into a guide hole 116 formed on the ratchet 90 so as to interlock with the ratchet 90. The guide hole 116 is a slit extending in the direction (as indicated by the arrow C in FIG. 1) where the hook 42 of the slider 28 comes in. One end side which is in the direction where the hook 42 of the slider 28 comes in, is expanded. The pin 112 comes into an expanded portion 116B from a narrow portion 116A when the slide block 92 is pushed and shifted by the hook 42 of the slider 28 on the way thereinto. In the disposition where the pin 112 has come into the narrow portion 116A with the guide hole 116, a swing of the ratchet 90 is constrained against a force of the leaf spring 106, and the lock shaft 96 is displaced from the hook 42 of the slider 28. Then, in the disposition where the pin 112 has come into the expanded portion 116B of the guide hole 116, the ratchet 90 is made swingable in the direction (as indicated by the arrow B in FIG. 1) where the lock shaft 96 is locked on the hook 42 of the slider 28. Thus the ratchet 90 is swung by force of the leaf spring when the hook 42 of the slider 28 enters, and the lock shaft 96 is locked on the hook 42 of the slider 28.

The contact 114 is fixed on the slide block 92 and is ready for shifting in accordance with the shifting of the slide block 92. The contact 114 is made to correspond to a terminal 120 in the housing 70. The terminal 120 is fixed to the housing 70 through a switch housing 122, comes in contact with the contact 114 at a webbing-girded position of the slider 28, separates from the contact 114 at a position where a webbing-girded state is released, detects the webbing-girded position of the slider 28, and stops operation of the driving device 40 at the webbing-girded position of the slider 28.

A function of the embodiment will be described next.

When girding with a webbing, the driving tape 47 is shifted toward the rear of a car through a tensile force by the driving device 40. The driving tape 47 then pushes the claws 46 of the slider 28 at the longitudinal edge portions 52A, 54A of the elongated slits 52, 54 on a car front side, and is coupled integrally with the slider 28 to provide the slider 28 with a driving force toward a rearward of the car. The slider 28 is guided by the guide rail 22 by the driving force to shift toward the rear of the car.

Here, the driving tape 47 has the claws 46 of the slider 28 inserted and locked in each elongated slit 52, 54 and is coupled to the slider 28 at two portions. Therefore a coupling strength with the slider 28 can be fully secured without particular consideration for increasing strength by thickening the walls and so forth.

When the slider 28 is shifted, the hook 42 separates from the driving tape 47, as shown in FIG. 6, at a linear portion of the guide rail 22. The hook 42 is inserted into the elongated slit 52, as shown in FIG. 7, at a bend of the guide rail 22, thus not interfering with the driving tape 47. Since the slider 28 shifts toward the rear of a car, the hook 42 enters into the housing 70. The slide block 92 thus pushed by the hook 42 of the slider 28 is shifted in the direction (as indicated by the arrow C in FIG. 1) where the hook 42 enters in against a force of the compression coil spring 110. The pin 112 then arrives in the expanded portion 116B from within the narrow portion 116A of the guide hole 116 of the ratchet 90. The ratchet 90 is swung in the direction (as indicated by the arrow B in FIG. 1) where the lock shaft 96 is locked on the hook 42 of the slider 28 by a force of the leaf spring 106 according to a shift of the pin 112, and the lock shaft 96 is thus locked on the hook 42 of the slider 28 as shown in FIG. 1.

At the time of locking, the protrusions 108 of the ratchet 90 are brought into contact with the end portion 111 or around (indicated in FIG. 2) the housing 70 on the guide rail side, thus keeping the lock shaft 96 from coming in contact with the slider 28. Since the housing 70 and the ratchet 90 are both made of resin, a contact of metals will not arise. Therefore, an abnormal sound caused by the locking of the lock shaft 96 with the hook 42 of the slider 28 is minimized.

In the state where the lock shaft 96 is locked on the hook 42 of the slider 28, the lock shaft 96 is kept in contact with the protrusions 104 of the reinforcement anchor 60, and the slider 28 is locked on the protrusions 104 of the reinforcement anchor 60 through the lock shaft 96. Consequently, a satisfactory locking strength of the slider 28 on the reinforcement anchor 60 is obtainable even though the ratchet 90 is made of resin.

Here, the reinforcement anchor 60 is kept from falling against a rear end portion of the guide rail 22 by the protrusions 64 and the projections 66, and the hook 72 of the housing 70 is locked on the guide rail 22 and mounted integrally with the guide rail 22. Therefore a rivet or the like for mounting the guide rail 22 is not required making for moderate cost.

Then, the reinforcement anchor 60 can be mounted simply to the guide rail 22 by inserting a rear end portion of the guide rail 22 longitudinally before setting the housing 70 therein, and then setting the housing 70 by means of the spring pin 68, thus simplifying the setting of the reinforcement anchor system.

Further, in the state where the lock shaft 96 is locked on the hook 42 of the slider 28, the contact 114 is put into contact with the terminal 120 by a shift of the slide block 92. Thus the driving device 40 is stopped operating, and the slider 28 is stopped from shifting. A crew member is girded with the webbing 30 in the state as illustrated in FIG. 9.

For releasing a webbing-girded state, a compressive force is provided to the driving tape 47 by the driving device 40, thereby shifting the driving tape 47 toward the front of a car. The driving tape 47 shifted toward the front of the car pushes the claw 109 of the ratchet 90 at the longitudinal edge portion 52B of the elongated slit 52 on the car rear side, swings the ratchet 90 to detach the lock shaft 96 from the hook 42 of the slider 28. Then the longitudinal edge portions 52B, 54B of the elongated slits 52, 54 on the car rear side come in contact with the claws 46 of the slider 28. The claws 46 of the slider 28 are thus pushed by the longitudinal edge portions 52B, 54B of the elongated slips 52, 54 to provide a driving force to the slider 28. The slider 28 is shifted to the car front side by the driving force as shown in FIG. 5, and a webbing-girded state of the crew member 38 is released. Then, in this case, the slider 28 has the hook 42 inserted in the elongated slit 52, as shown in FIG. 8, at the bend of the guide rail 22, thus not interfering with the driving tape 47.

As described above, in the automatic seat belt system relating to the invention, an enclosing part in which the guide rail is inserted longitudinally only is formed on the reinforcement anchor, a locking part locked on the guide rail and constraining a shift of the reinforcement anchor longitudinally of the guide rail is formed on the housing. The reinforcement anchor is fixed on the guide rail through the housing. Therefore such construction is effective in building up the reinforcement anchor system simply.

What is claimed is:

1. An automatic seat belt system capable of girding a crew member automatically with a webbing, comprising:
    a slider on which one end portion of said webbing is supported;
    a guide rail supporting said slider slidably thereon to guide frontward and rearward of a car, the crew member being girded with the webbing when the slider is positioned at an end portion of the guide rail on a car rear side;
    a reinforcement anchor mounted on an end portion of the guide rail on a car rear side to reinforce the end portion of the guide rail on the car rear side;
    a lock member locked on the slider when said slider is positioned at an end portion of the guide rail on a car rear side;
    a housing enclosing said lock member therein, mounted on the reinforcement anchor, and supporting the lock member on the reinforcement anchor;
    an enclosing part provided on said reinforcement anchor, allowing said guide rail to enter therein only from its longitudinal end portion; and
    locking means for locking the guide rail enclosed in said enclosing part and the housing, fixing the guide rail on the reinforcement anchor through the housing.

2. The automatic seat belt system as defined in claim 1, said locking means comprising a locking part provided in said housing and extending in the direction of the guide rail enclosed in the enclosing part, and a locked part locked on said locking part formed on said guide rail.

3. The automatic seat belt system as defined in claim 2, wherein said locking part is provided with a hooked portion, said locked part comprises a recession in which the hooked portion is locked.

4. The automatic seat belt system as defined in claim 3, said recession consisting of a grooved portion extended to an outer surface of said guide rail in the cross direction of the guide rail.

5. The automatic seat belt system as defined in claim 1, wherein said enclosing part is partitioned by a bottom wall of the reinforcement anchor substantially U-shaped in section, a pair of opposed walls and a first projection formed projectingly to be opposite to said bottom wall from the opposed walls.

6. The automatic seat belt system as defined in claim 5, wherein said first projection is provided at a plural spot in the direction where said guide rail is inserted in the enclosing part.

7. The automatic seat belt system as defined in claim 6, wherein a recession for enclosing the first projection therein is provided on a surface of the guide rail opposite to said first projection which is positioned at the innermost of the enclosing part.

8. The automatic seat belt system as defined in claim 5, wherein said first projection is provided on both opposed walls.

9. The automatic seat belt system as defined in claim 1, wherein a second projection projecting toward said lock member is formed on said reinforcement anchor, and when the slider is positioned at an end portion of the guide rail on a car rear side, the lock member is brought into contact with said second projection, thereby supporting a load working on the slider on said second projection.

10. The automatic seat belt system as defined in claim 1, provided with a support member enclosed in said housing, supporting said lock member thereon and shifted to shift the lock member to a position where it is locked on the slider, wherein a third projection for bringing both said support member and housing into contact with each other at the position where the lock member is locked on the slider is formed on at least one of them, the lock member is kept from contacting with the slider by bringing the support member into contact with the housing through the third projection when the lock member is locked on the slider.

11. The automatic seat belt system as defined in claim 1, provided with a driving tape enclosed in the guide rail longitudinally thereof, coupled to the slider and shifted longitudinally by a longitudinal compressive force or tensile force to provide a driving force to the slider, wherein a locking hole in which the slider is inserted and locked is provided on the driving tape at a plural portion separated longitudinally, thus coupling the slider and the driving tape at a plural portion.

12. An automatic seat belt system capable of girding a crew member automatically with a webbing, comprising:
- a slider on which one end of said webbing is supported;
- a guide rail supporting the slider slidably to guide frontward and rearward of a car room, guiding the webbing to a position where to gird a crew member;
- a driving tape enclosed in the guide rail longitudinally thereof, coupled to the slider and shifted longitudinally by a longitudinal compressive force or tensile force to provide a driving force to the slider;
- a reinforcement anchor mounted on a car room rear side end portion of the guide rail supporting the slider at a position where the crew member is girded with the webbing, and reinforcing the guide rail end portion;
- a lock member locked on the slider at a position where the crew member is girded with the webbing;
- a housing enclosing the lock member therein, mounted on the reinforcement anchor, and supporting the lock member on the reinforcement anchor;
- an enclosing part provided on said reinforcement anchor, allowing said guide rail to come therein from its car room rear side end portion; and
- a locking part provided on said housing, locked on the guide rail inserted in the enclosing part, and fixing the guide rail on the reinforcement anchor through the housing.

13. The automatic seat belt system as defined in claim 12, wherein a locked part on which said locking part is locked is provided on the car room rear side end portion of said guide rail.

14. The automatic seat belt system as defined in claim 13, wherein said locking part has a hooked portion, and said locked part has a groove in which the hooked portion is locked.

15. The automatic seat belt system as defined in claim 12, wherein said enclosing part is partitioned by a bottom wall of the reinforcement anchor substantially U-shaped in section, a pair of opposed walls and a first projection formed projectingly to be opposite to said bottom wall from the opposed walls.

16. The automatic seat belt system as defined in claim 15, wherein said first projection is provided at a plural spot in the direction where said guide rail is inserted in the enclosing part.

17. The automatic seat belt system as defined in claim 16, wherein a recession for enclosing the first projection therein is provided on a surface of the guide rail opposite to said first projection which is positioned at the innermost of the enclosing part.

18. The automatic seat belt system as defined in claim 15, wherein said first projection is provided on both opposed walls.

19. The automatic seat belt system as defined in claim 12, wherein a second projection projecting toward said lock member is formed on said reinforcement anchor, and when the slider is positioned at an end portion of the guide rail on a car rear side, the lock member is brought into contact with said second projection, thereby supporting a load working on the slider on said second projection.

20. The automatic seat belt system as defined in claim 12, provided with a support member enclosed in said housing, supporting said lock member thereon and shifted to shift the lock member to a position where it is locked on the slider, wherein a third projection for bringing both said support member and housing into contact with each other at the position where the lock member is locked on the slider is formed on at least one of them, the lock member is kept from contacting with the slider by bringing the support member into contact with the housing through the third projection when the lock member is locked on the slider.

* * * * *